Dec. 2, 1930. P. P. BEBRY 1,783,530
SLIDING COUCH
Filed Feb. 14, 1929 3 Sheets-Sheet 2
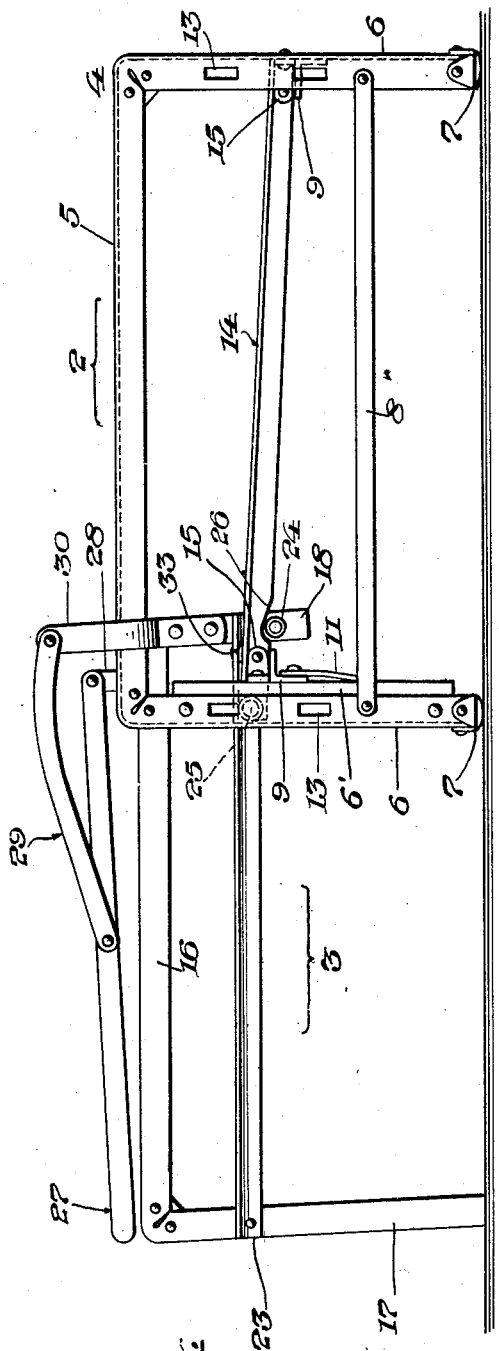
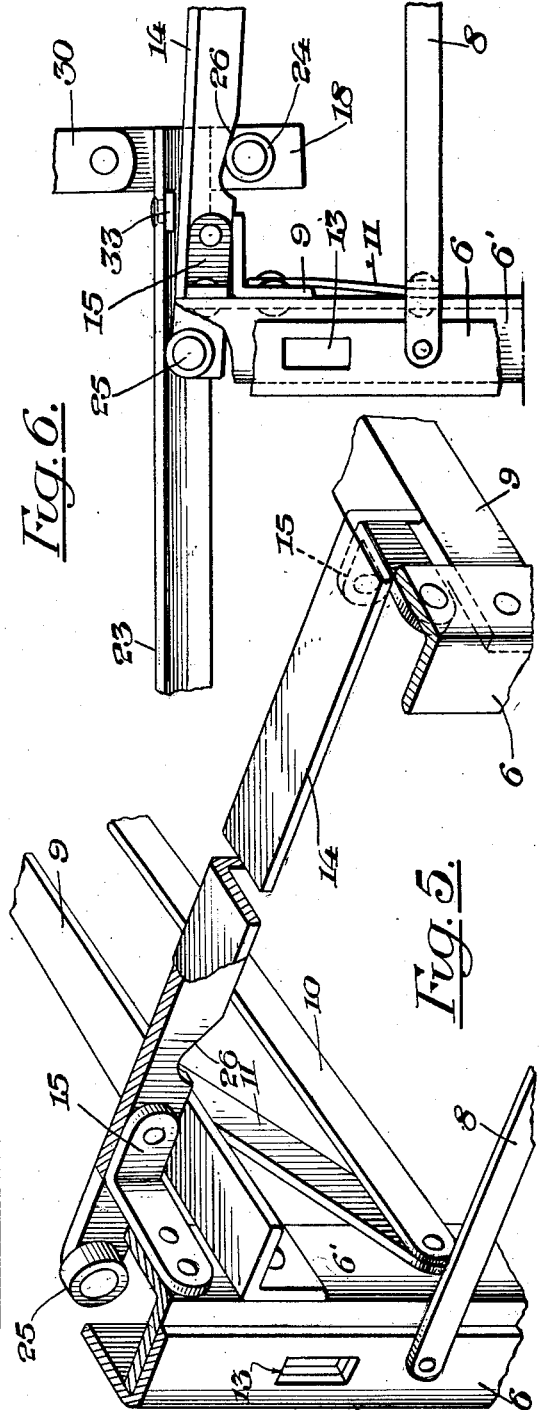
Inventor
Percival P. Bebry
by his Attorney

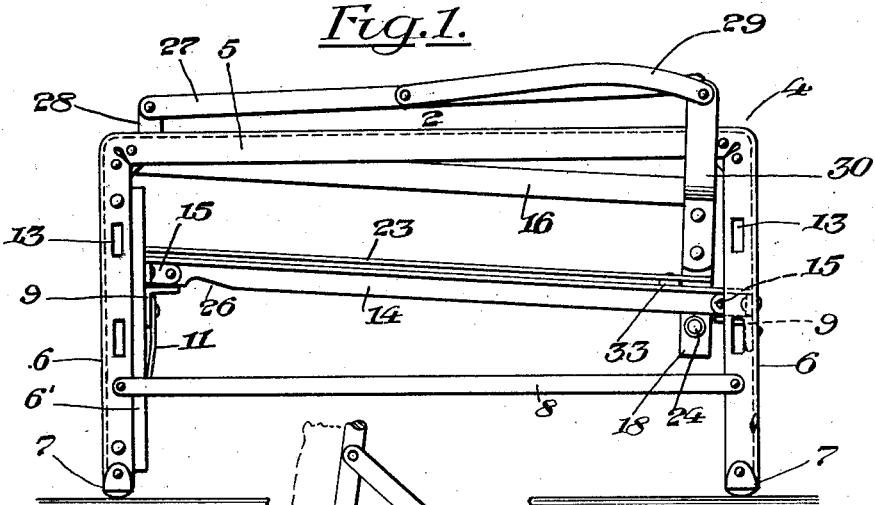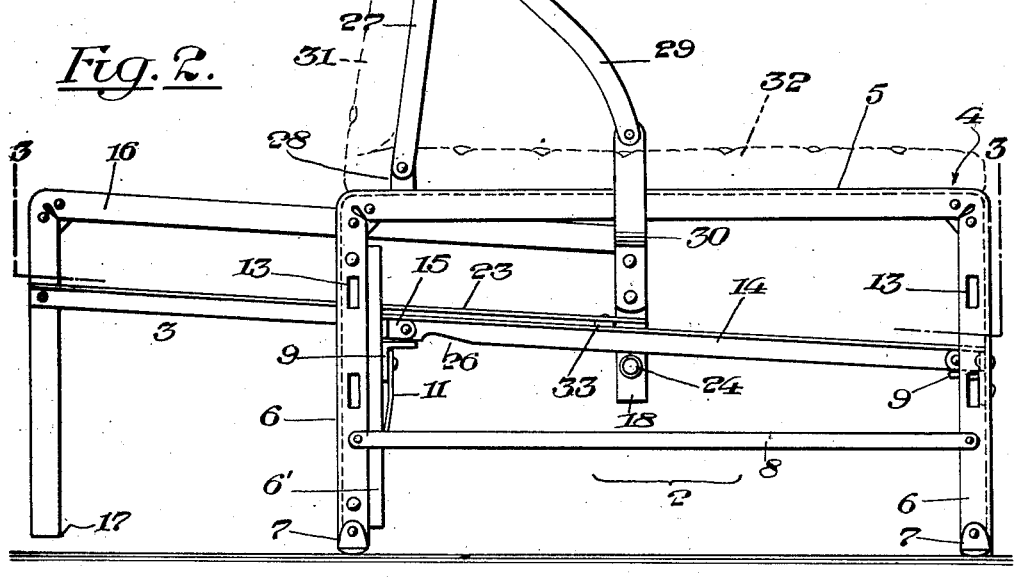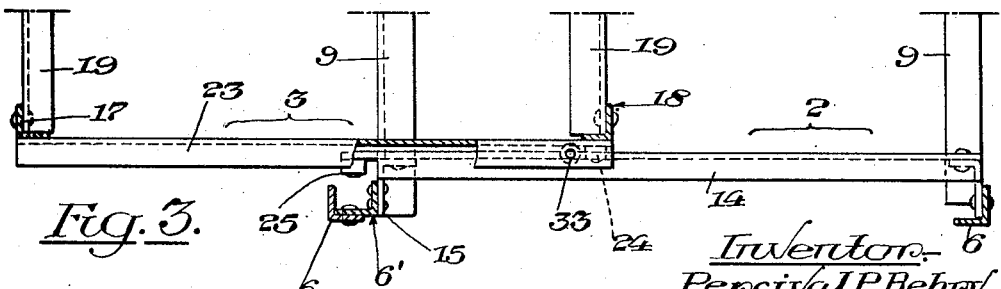

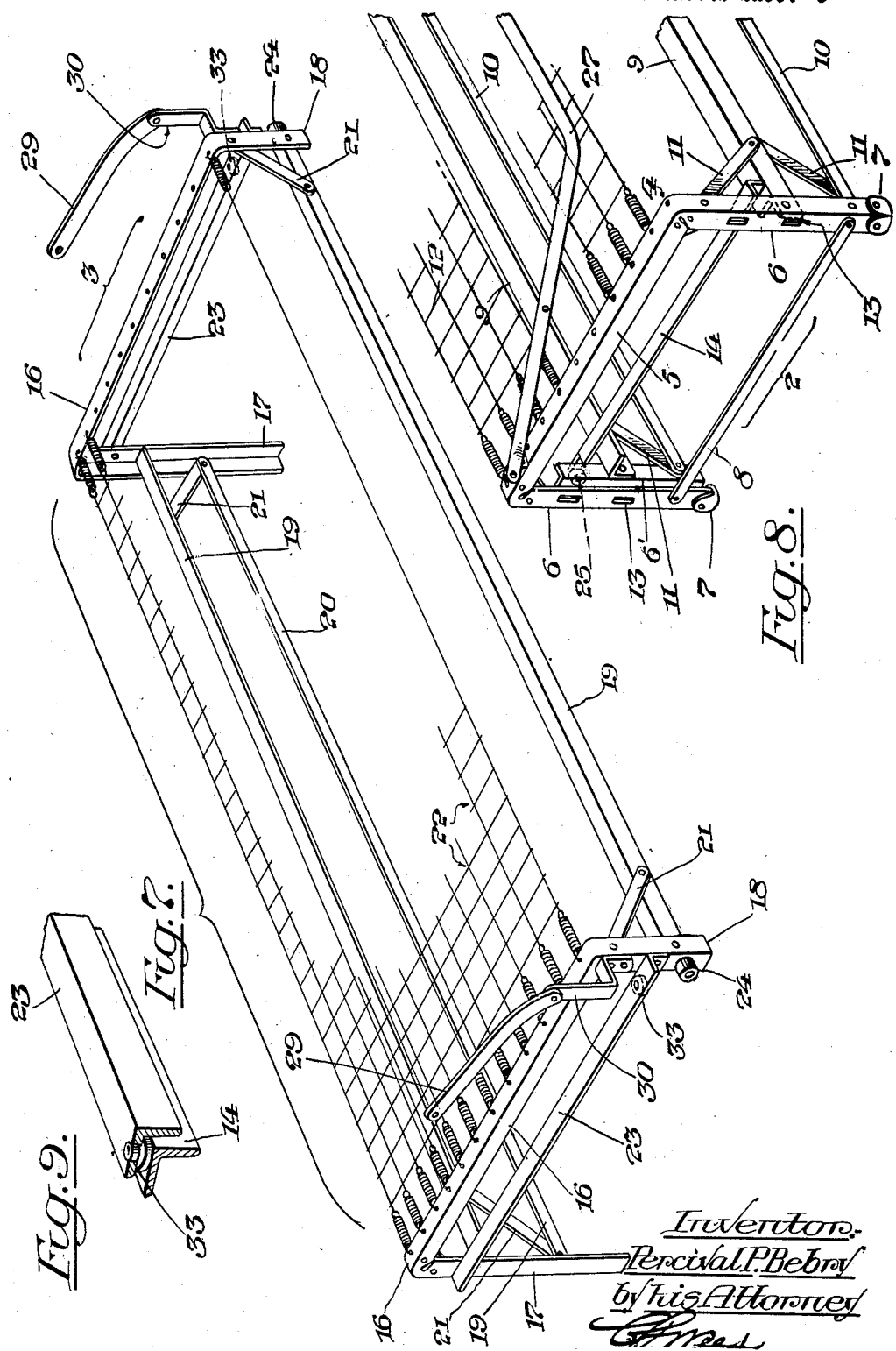

Patented Dec. 2, 1930

1,783,530

UNITED STATES PATENT OFFICE

PERCIVAL P. BEBRY, OF HYDE PARK, BOSTON, MASSACHUSETTS, ASSIGNOR TO ENGLANDER SPRING BED COMPANY, OF NEW YORK, N. Y., A CORPORATION OF NEW YORK

SLIDING COUCH

Application filed February 14, 1929. Serial No. 339,820.

This invention relates to couch beds or sliding couches, the object of the invention being to provide an improved sliding couch comprising a pair of nested beds or sections one sliding relatively to the other with means whereby the sliding section is prevented from engaging the floor during the sliding movement of the section but permitted to rest thereon when the sliding section is fully extended, thereby to prevent the marring, scratching or injury of the floor and the rucking up or wrinkling of the floor covering or rug upon which the bed may rest or the compressing, setting or injury of the surface or pile of such floor covering.

A further object of the invention is the provision of an improved sliding couch bed provided with means automatically operative to maintain the sliding section off the floor during the sliding movement thereof and automatically lower and raise the same after the sliding section is fully extended.

Another object of the invention is the provision of an improved sliding couch bed provided with means for shifting the sliding section and with means co-operating therewith and so organized as to hold the sliding section off the floor during all of the sliding movements thereof and permit it to engage the floor when the sliding section is fully extended and which shifting means is also operative simultaneously to fold and unfold a sectional or book mattress, and which couch bed is simple in construction, durable in use, efficient in operation, and inexpensive to manufacture, and by means of which the disadvantages of sliding couches as heretofore manufactured are entirely eliminated.

In the drawing accompanying and forming a part of this specification—

Figure 1 is an end view of this improved sliding couch in its closed position;

Fig. 2 is a view thereof partly open;

Fig. 3 is a sectional view taken on line 3—3, Fig. 2;

Fig. 4 is a view of this improved sliding couch in its fully extended or open position;

Fig. 5 is a detail perspective view of one end of the main section of the couch bed;

Fig. 6 is a detail view of a portion of the main and sliding couch sections showing the manner in which they are assembled;

Fig. 7 is a perspective view of the sliding couch section;

Fig. 8 is a perspective view of one end of the main couch section; and

Fig. 9 is a perspective sectional view of a pair of end cross-bar tracks.

Similar characters of reference indicate corresponding parts in the several views.

Before explaining in detail the present improvement and mode of operation thereof, I desire to have it understood that the invention is not limited to the details of construction and arrangement of parts which are illustrated in the accompanying drawings, since the invention is capable of other embodiments, and that the phraseology which I employ is for the purpose of description and not of limitation.

Sliding couch beds as heretofore constructed comprise a main bed or section and a sliding bed or section, so assembled that the sliding section has its spring or mattress fabric sliding under the spring or fabric of the main section in close relationship thereto, whereby the two beds are substantially level when the bed is extended. One of the great disadvantages of such beds, is that the sliding section has its feet or legs at the forward side always resting upon the floor so that the movement of the sliding section injured the floor when uncovered by scratching or marring it and when covered by rucking up or wrinkling the covering or rug and injuring the surface thereof by setting or compressing the pile, thus leaving the floor or rug with an unsightly appearance and this could not be prevented by the use of castors of any kind or other protective means since whatever was used necessarily scraped along the floor and marked the same, and many complaints had been made, but heretofore no practicable way to avoid this serious disadvantage was discovered. In the present improvement, however, these disadvantages are eliminated by reason of the fact that the sliding section is always maintained with its legs or feet held off of and spaced from the floor during the entire sliding movement of the sliding section, but which legs, however, are permitted to engage the floor when the sliding section has been fully extended, thereby to take the weight of the bed and of the user, so that this serious disadvantage is no longer present in this improved form of sliding couch bed. The present improvement results in the provision of a couch bed in which the fabrics of the two beds are not only maintained substantially level when the bed is extended and in which the extensible section is operated by the simple shifting of a lever which simultaneously throws a section of the mattress onto the sliding section or the main section, but in which the great advantage of operating the sliding section without injury to the floor or the covering thereof and without interference with the operation of the sliding section by the wrinkling or rucking up of the floor covering is made possible.

While this improvement may be adapted to various forms of beds having a sliding section and in which the bed sections are provided with either flat springs or fabrics or spiral springs, it is in the present instance shown as applied to a sliding couch bed having flat springs, and in the preferred form thereof this improved couch bed comprises a main section 2 and a sliding section 3. The main section comprises a pair of end frames 4 shown constructed of angle-iron, each comprising a top cross-bar 5 and a pair of depending legs 6 which may be provided with "domes of silence" 7 or castors as desired. The legs of each end frame are connected by a cross brace bar 8 and the two end frames are connected by longitudinal side bars 9 spaced below the tops of the end frames and also by stiffening straps 10, all suitably braced by diagonal braces 11, the side bars usually being in the form of angle-irons. Between the end frames, in the present instance, is stretched a suitable flat spring fabric 12 coil-connected with the end frames.

The legs of the end frames are provided with slots 13 for the attachment of suitable ornamental heads when such are used.

Above the cross-braces 8 are located a pair of inclined guide bars or tracks 14 shown formed of angle-iron, these tracks being inclined slightly upward from the outer to the inner side of the main section. In practice this bar has an inclination of about an inch and a half for its length, whereby the legs of the extensible section will be maintained away from the floor for approximately a quarter of an inch. These tracks rest on top of the side bars 9 at the inside of the end frames and are secured in any suitable way, as by braces 15, the inner or forward ends of the tracks being secured to a supplemental angle-iron reinforcement 6' secured to the inner leg 6.

The extensible section 3 is constructed substantially like the main section and, therefore, comprises a pair of end frames 16 having depending front legs 17 and short rear legs 18, the legs being connected by side bars 19, the front legs 17 being also connected by a stiffening strap 20. The side bars are suitably braced by diagonal braces 21. Stretched between the end frames is a similar spring or fabric 22 coil-connected to the end frames. The legs of the extensible section are provided on the outside thereof with straight guide bars or tracks 23, preferably formed of angle-iron, in position to have the tops thereof overlap the tops of the tracks or guide bars 14 of the main section.

In assembling the two sections, the inner legs 18 of the sliding section are passed between the spring fabric and a side bar 9 of the main section so that the end frames of the sliding section are located between the end frames of the main section, thereby permitting the two sections properly to nest in such way that the spring fabrics of the two sections are substantially parallel when the sections are extended and one under the other when the sections are closed.

Carried by the short inner legs 18 of the sliding section, adjacent to the lower ends thereof, are guide rolls 24 in position to engage the under sides of the tracks 14, and carried at the forward end of these tracks 14 are guide rolls 25, the ends of the angle-iron bar tracks 14 being cut away to permit these rolls to be properly located in position to engage the under faces of the top portions of the tracks 23 of the sliding section. The tracks 14 are suitably cut away or recessed, as at 26, to permit the rolls 24 to pass into these recesses or notches when the sliding section is fully extended and thus permit the forward legs 17 of the sliding section to engage the floor.

For the purpose of shifting or sliding the extensible section, an operating bar 27, shown of U-shaped form, is pivotally connected by lugs 28 to the top of the main section and connected by links 29 to brackets 30 secured to the short legs 18 of the sliding section, whereby on operating this bar the sliding section will be shifted out to form a double bed or under the spring fabric of the main section to close the bed into couch form. Carried by this operating bar is one section 31 of a foldable or book mattress, the other section 32 of which is connected to the main section, so that on the opening of this bar the book mattress will be opened to rest on the sliding section and on throwing this bar over onto the main section to shift the sliding section thereunder the foldable section of the book mattress will fold on top of the main section thereof.

In operation the rolls 25 at the forward or inner ends of the tracks 14 engage the under sides of the track bars 23 and guide the track bars 23 of the extensible section during their sliding movement, while the rolls 24 located under the edges of the track bars 14 maintain the sliding section off the floor during the shifting movement thereof, with the result that due to the inclination of the track bars 14 the legs 17 of the extensible section are maintained spaced from the floor approximately one-quarter of an inch during the entire in and out sliding movement of the extensible section. When, however, the rolls 24 reach the recesses or notches 26 of the track bars 14, these recesses permit the rolls 24 to pass thereinto, thus raising the inner side of the extensible section and lowering the outer side thereof to engage the floor and thus support the weight of the sliding section of the bed. The recesses, which are about a quarter of an inch in depth at their deepest part, have their top walls inclined to facilitate the passing of the rolls 24 into and out thereof. Thus during the swinging of the operating bar 27 the sliding section is moved in and out and the shiftable section of the foldable mattress is opened or closed, while during all of the movement of the sliding section the feet thereof are maintained spaced above the floor. When, however, the rolls 24 reach the notches 26 of the track bars 14, the outer feet 17 of the extensible section shift into engagement with the floor. In practice, for preventing the scraping of one track bar upon the other and the noise incidental thereto, as well as to properly space and maintain the two track bars in parallel relation during the shifting movement of the sliding section, a spacer 33 is provided on the inner end of the track bars 23 in position to engage and slide along the top of the track bars 14.

From the foregoing it will be observed that by reason of the inclination of the track bars 14 of the main section and the guide rolls 24 of the sliding section located thereunder, the two track bars are maintained practically parallel during the sliding movement of the sliding section in or out, with the forward feet 17 of the sliding section spaced from the floor. During one-half of the sliding movement outward, however, the guide rolls 24 are practically free of the track bars 14. When, however, the sliding section has been shifted about half way out, the guide rolls 25 then act as a fulcrum for the sliding section so that the weight of the forward half of the sliding section then causes the guide rolls 24 to engage the under sides of the track bars 14, and so prevents the sliding section from engaging the floor, so that these rolls 24 and track bars 14 thus carry the weight of the sliding section during the latter half of its shifting movement and until the rolls 24 reach the recess in the track bars 14, whereupon the weight of the sliding section causes these rolls to pass into the recesses, thereby permitting the sliding section to move vertically or gently fall into engagement with the floor. On the closing movement the moment the rolls 24 start down the inclined walls of the recesses, which occurs at the initial shifting of the sliding section, the feet of the sliding section are immediately raised from the floor. It will be further observed that when the sections are nested, the legs 17 and the legs 6 are in parallelism, this being obtained by slightly inclining inwardly the legs 17 of the extensible section.

Thus, by the present improvement, all danger of injuring or marring either the floor or the covering thereof or wrinkling it or rucking it up to prevent the proper and quick shifting of the sliding section, is entirely done away with.

It is to be understood that by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made or all of the modes of its use, I claim:

1. In a sliding couch bed, the combination of a pair of bed sections, one sliding relatively to the other and each having co-operating track bars and rolls, one carried by each section, the track bars of the main section having inclination in the direction of their length and provided with notches at their forward ends, whereby the sliding section is maintained away from the floor during the sliding movement and permitted to engage the floor when the bed is fully extended, rolls of the sliding section entering the notches of said inclined track bar thereby to permit the sliding section to swing downward to engage the floor.

2. In a sliding couch bed, the combination of a main section and a sliding section, said sections having co-operating track bars, that of the main section being inclined relatively to that of the sliding section when the bed is extended and having a recess at its forward end, a guide roll carried by the main section for engaging the under side of the track bar of the sliding section, and a guide roll carried by the sliding section for engaging the under side of the track bar of the main section and in position to enter said recess when the beds are extended thereby to permit the outer side of the sliding section to swing downwardly and engage the floor.

3. In a sliding couch bed, the combination of a main section and a sliding section, co-operating track bars carried by the two sections, those of the main section being inclined relatively to those of the sliding section when the bed is extended and having recesses at their forward ends, guide rolls carried at the forward ends of the track bars of the main section for engaging the under sides of the track bars of the sliding section, and guide rolls carried at the rear ends of the sliding section for engaging the under sides of the track bars of the main section and in position to enter said recesses when the beds are extended thereby to permit the outer side of the sliding section to swing downwardly and engage the floor.

4. In a sliding couch bed, the combination of a main section and a sliding section, co-operating track bars carried by the two sections, those of the main section being inclined relatively to those of the sliding section when the bed is extended and having recesses at their forward ends, guide rolls carried at the forward ends of the track bars of the main section for engaging the under sides of the track bars of the sliding section, and guide rolls carried at the rear ends of the sliding section for engaging the under sides of the track bars of the main section and in position to enter said recesses when the beds are extended thereby to permit the outer side of the sliding section to swing downwardly and engage the floor, the depth of the recesses being approximately the distance that the sliding section is maintained off the floor during the sliding movement.

5. In an extensible couch bed, the combination of a main section having a mattress support or fabric and an extensible section also having a mattress support or fabric slidable under the mattress support of the main section and also having stationary, downwardly-projecting supporting legs normally in position to engage the floor when the extensible section is fully extended, said sections having co-operating track bars, the track bars of the main section being inclined relatively to those of the extensible section when the bed is extended, and having means whereby the outer side of the sliding extensible section will have a swinging movement in a vertical plane when the extensible section is fully extended, and means carried by said sections and co-operating with the track bars thereby to maintain the extensible section lifted from the floor during its shiftable movement and effect engagement with the floor when fully shifted, said means comprising recesses carried by the track bars of the main section and rolls carried by said sections, a pair of said rolls being adapted to be shifted into said recesses.

Signed at Boston, Mass., this 11th day of February, 1929.

PERCIVAL P. BEBRY.